United States Patent Office 3,531,457
Patented Sept. 29, 1970

3,531,457
5-ARYLAZO-PYRIMIDINE MONOAZO DYESTUFFS
Hans Ackermann, Werner Bossard, Jacques Voltz, and Hans Wegmuller, Riehen, Switzerland, assignors to J. R. Geigy A.G., Basel, Switzerland
No Drawing. Filed Nov. 8, 1967, Ser. No. 681,552
Claims priority, application Switzerland, Apr. 28, 1967, 6,126/67
Int. Cl. C09d 29/36; D06p 1/02
U.S. Cl. 260—154
5 Claims

ABSTRACT OF THE DISCLOSURE

Dispersible dyes which are 5 - arylazopyrimidines wherein one of the carbon atoms in 2-, 4- and 6-position of the pyrimidine ring is substituted by an aliphatic, araliphatic, cycloaliphatic or carbocyclic aromatic radical bound by way of an —O— or —S— bridge to the pyrimidine nucleus and the remaining carbon atoms in the aforesaid positions are substituted by aliphatically, araliphatically or cycloaliphatically mono-substituted amino groups and the arylazo moiety comprises preferably a nitrophenyl radical; such dyestuffs being distinguished by good affinity especially for polyester fibers, affording dyeings on these fibers which have good fastness properties and especially good light fastness; processes for dyeing polyester fibers with the aforesaid dyestuffs; and compositions containing polyester fiber materials and such dyestuffs.

DESCRIPTION OF THE INVENTION

The present invention concerns new, difficultly water soluble dyestuffs which can be used as dispersion dyestuffs, processes for their production, processes for the dyeing of hydrophobic organic fiber material, particularly textile fibers made from linear high molecular esters of aromatic polycarboxylic acids with polyvalent alcohols or from cellulose esters and, as industrial product, the fiber material dyed with the new dyestuffs.

It is common knowledge that a prerequisite for the successful dyeing of polyester fibers—in addition to satisfactory fastness properties both on application and in use—is an excellent drawing power and unexpectedly good buildup of the dispersion dyestuffs used therefor. However, the dyeing of texturized polyester fiber material, i.e. fabrics made from crimp yarn, e.g. Crimplene, makes great demands of the dyestuffs to be used since, for this purpose, in addition to good fastness properties and sufficient drawing power and buildup, very good leveling power of the dyestuffs is imperative.

It has now been found that new, difficultly water soluble dyestuffs which meet the above and other requirements conventionally made of dispersible dyes, are those of the formula

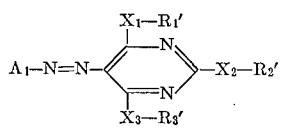

(IIIA)

wherein $A_1$ represents a phenyl radical substituted as follows:

(a) by, as first substituent, a nitro group;
(b) by a second substituent selected from nitrogen, nitro, cyano, chlorine, bromine, lower alkyl, lower alkoxy, phenoxy, lower alkylsulfonyl, phenoxysulfonyl, lower alkylphenoxysulfonyl, lower alkoxycarbonyl, hydroxy lower alkoxycarbonyl, lower alkoxy-lower alkoxycarbonyl and a substituent of the formula

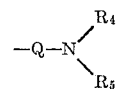

wherein

Q represents —$SO_2$— or —CO—;
$R_4$ represents hydrogen, lower alkyl, hydroxy-lower alkyl, lower alkoxy-lower alkyl, benzyl or cyclohexyl; and
$R_5$ represents hydrogen, lower alkyl or hydroxyl-lower alkyl; and (c) by a third substituent selected from hydrogen, chlorine or bromine;

One of the groupings —$R_1'$, —$R_2'$ and —$R_3'$ represents alkyl of from 2 to 5 carbon atoms substituted by at least one of the following; hydroxy, lower alkoxy, cyclohexyloxy, benzyloxy, a phenyloxy radical any substituent of which is selected from hydrogen, lower alkyl, lower alkoxy, chlorine and bromine; lower alkanoyloxy, benzoyloxy, lower alkoxy-carbonyloxy, phenyl-sulfonyloxy and lower alkyl-phenyl-sulfonyloxy; and Each of the remaining (R')'s represents lower alkyl, cyclohexyl, benzyl, hydroxy-lower alkyl, lower alkoxy-lower alkyl or lower alkanoyloxy-lower alkyl, or a phenyl radical bound by way of an —O— or —S— bridge to the pyrimidine nucleus, and One of $X_1$, $X_2$, and $X_3$ represents —O— or —S—, and the other two X's represent —NH—.

Preferably the aforesaid nitro substituent of $A_1$ is in o- or p-position relative to the azo bridge at the said phenyl radical.

The dyestuffs according to the invention which fall under Formula IIIA are suitable mainly for the dyeing of hydrophobic, organic fiber material from aqueous dispersion, in particular for the dyeing of textile fibers made from linear high molecular esters of aromatic polycarboxylic acids with polyfunctional alcohols, e.g. made from polyglycol terephthalates, polyglycol isophthalates or polycyclohexane diol terephthalates, or made from cellulose esters, e.g. cellulose-2½-acetate and cellulose triacetate fibers they produce strongly colored greenish yellow, yellow, orange, scarlet, red and brown dyeings which have excellent fastness to washing, milling, sublimation, light, rubbing, perspiration, solvents, cross-dyeing, decatising, gas fading and industrial fumes.

Dyestuffs according to the invention can also be used, however, for the dyeing of synthetic polyamide fibers such as nylon, as well as for the dyeing of polyolefins, particularly polypropylene fibers.

Polyglycol terephthalate fibers are dyed with aqueous dispersions of dyestuffs according to the invention preferably at temperatures of over 100° C. under pressure. The dyeing can also be performed at the boiling point of the dye liquor however, in the presence of carriers such as alkali metal phenyl phenolates, polychlorobenzene compounds or similar auxiliaries, or it can be performed by the pad-dyeing process followed by a heat treatment, e.g., thermofixing at 180–220° C. Cellulose-2½-acetate fibers are preferably dyed at temperatures of 80–85° C. whilst cellulose triacetate fibers and synthetic polyamide fiber material are advantageously dyed at the boiling point of the dyebath. The use of carriers is not necessary when dyeing the last mentioned type of fibers. Azo dyestuffs according to the invention can also be used for printing the materials mentioned by the usual methods.

In addition, vegetable and animal fibers, particularly cotton or wool, are very well reserved by the dyestuffs according to the invention. Even on tightly woven fabric or tightly twisted yarns, good and level, penetrated dyeings are obtained with the dyestuffs according to the invention.

Dyestuffs according to the invention, particularly as mixtures of isomers, differ from previously known dyestuffs of similar constitution by their good drawing power and buildup onto polyglycol terephthalate fibers. In addition, in most cases, dyeings attained with dyestuffs according to the invention have substantially better fastness to light and sublimation.

Dyestuffs according to the invention are also suited for the dyeing of cellulose acetates, polyglycol terephthalates and polyamides in the mass. Because of their good solubility in organic solvents such as acetone or chloroform, they can also be used in lacquers and printing inks.

The azo dyestuffs of Formula IIIA and dyestuffs of similar structure but some of which are less easily producible, and which are generally of inferior light fastness are obtained by coupling the diazonium compound of an amine of the formula $$A—NH_2 \quad (I)$$

with a coupling component of the formula

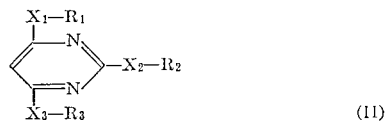

(II)

to form an azo dyestuff of the formula

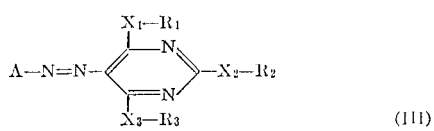

(III)

In this coupling, the starting materials should be so chosen that the azo dyestuff obtained contains no ionogenic groups forming salts in water, i.e., it contains neither groups which dissociate acid in water such as sulfonic acid, carboxylic acid or phosphoric acid groups, nor onium groups such as ammonium or sulfonium groups.

In the Formulas I, II and III:

A represents a carbocyclic or heterocyclic aryl radical, of $X_1$, $X_2$ and $X_3$, one X represents an —O— or —S— bridge and the two other X's each represent an —NH— bridge, and
of $R_1$, $R_2$ and $R_3$, at least one R represents a radical of the formula —alk—O—Z wherein —alk— represents an optionally substituted alkylene radical and Z represents hydrogen, an acyl radical or an optionally substituted hydrocarbon radical, and the other R's each represent an optionally substituted alkyl, cycloalkyl or aralkyl group.

When A is a carbocyclic aryl radical, then this is a mono- or poly-nuclear, condensed or non-condensed, particularly an unsubstituted or non-ionogenically substituted phenyl or naphthyl radical. Preferably A is a phenyl radical non-ionogenically substituted by electron attracting substituents. Examples of electron attracting, non-ionogenic substituents are: halogens such as fluorine, chlorine or bromine; the cyano, thiocyano, nitro, trifluoromethyl group; also acyl groups, particularly carbacyl groups such as low alkanoyl or alkenoyl groups, further the aroyl groups such as the benzoyl group, or organosulfonyl groups such as low alkylsulfonyl or arylsulfonyl groups, also sulfonic acid aryl ester groups such as the sulfonic acid phenyl ester, alkylphenyl ester or halogenophenyl ester groups; carboxylic acid ester groups, e.g., the carbophenoxy group, particularly however, carbalkoxy groups such as the carbomethoxy, carboethoxy, carboisopropoxy or carbobutoxy group; the sulfonic acid or carboxylic acid amide group; N-mono- or N,N-disubstituted carbamoyl or sulfamoyl groups having a phenyl group and/or alkyl, hydroxyalkyl, acyloxyalkyl substituents, particularly low alkanoyloxyalkyl, alkoxyalkyl, cyanoalkyl or cycloalkyl or phenylalkyl substituents. All these groups can aso be further substituted non-ionogenically. However, in addition to the preferred, electron attracting substituents, the radical A can also contain non-ionogenic electron repelling substituents, e.g., low aliphatic, optionally non-ionogenically substituted, e.g., hydroxy substituted, hydrocarbon groups, optionally non-ionogenically substituted low alkoxy groups such as methoxy, ethoxy or ethoxycarbonylmethoxy groups, optionally non-ionogenically substituted aryloxy groups such as the phenoxy group and the alkyl or halogen substituted phenoxy groups, or acylamino groups, particularly carbacylamino groups, e.g., low alkanoylamino groups such as the acetylamino, aroylamino group such as the benzoylamino group, or also low alkylsulfonylamino groups such as the methylsulfonylamino group, or arylsulfonylamino groups such as the phenylsulfonylamino group.

When A is a naphthyl radical, it can be both an unsubstituted as well as a non-ionogenically substituted 1- or 2-naphthyl radical. Substituents in this case are mainly low alkyl and alkoxy groups, halogens such as chlorine or bromine, optionally N-substituted sulfonic acid amide groups, sulfonic acid low alkyl ester or low aryl ester groups, low alkylsulfonyl or arylsulfonyl groups.

When A contains an arylazo group, the azo groups in an aromatic homocycle preferably are in the p-position. The arylazo group is preferably unsubstituted; however, it can also be substituted by halogens such as fluorine, chlorine or bromine, or by low alkyl, low alkoxy groups or by the nitro group. These substituents are ring substituents. If A is e.g. a phenylazophenyl radical, then the phenylene radical can also contain further substituents, e.g. low alkyl or alkoxy groups, halogens such as fluorine, chlorine or bromine, or acylamino groups such as low alkanoylamino groups.

When A is a heterocyclic aryl radical then it is mainly radicals of 5- or 6-membered, particularly N-containing, heterocycles of, e.g. the pyrazole, thiazole, oxidiazole, thiodiazole, triazole or pyridine series. It can also be radicals of mononuclear condensed heterocycles which then, preferably, have a fused benzene ring, such as optionally non-ionogenically substituted benzothiazole, indazole or quinoline rings. These mono- or poly-nuclear heterocyclic aryl radicals can also contain non-ionogenic substituents of the type listed above which are usual in azo dyestuffs, particularly halogens, pseudohalogens such as cyano or thiocyano groups, nitro groups, lower alkyl, lower alkoxy, phenyl groups, lower alkylsulfonyl groups and sulfonic acid amide groups optionally substituted by lower alkyl or dialkyl groups.

Preferred azo dyestuffs according to the invention are those falling under Formula IIIA which are produced by using diazonium compounds of amines of Formula I wherein $A_1$ represents a phenyl radical having a nitro group in o- and/or p-position to the azo group, which phenyl radical is optionally substituted by other non-ionogenic, preferably electron attracting substituents.

In order to attain the desired sublimation fastness properties and a very good levelling power and buildup, at least one R in the azo dyestuffs of Formula III according to the invention must be the characteristic group —alk—O—Z. The alkylene group —alk— can be straight or branched chained; in the former case it is preferably the 1,2-ethylene or 1,3-propylene group, in the latter case it is the 1,2-propylene or 1,2-butylene group. Such divalent radicals can be substituted, e.g. by phenyl or lower alkoxy groups such as the methoxy or ethoxy group.

As acyl radical, Z is particularly a lower, unsubstituted or non-ionogenically substituted alkanoyl group the alkanoyl moiety of which preferably has 2 to 4 carbon atoms. As nonionogenic substituents, the alkanoyl group can contain, e.g. halogens such as chlorine or bromine, or low alkoxy groups such as the methoxy or ethoxy group.

As hydrocarbon radical, Z represents, e.g. a straight or branched chain alkyl radical having, preferably, 1 to 4 carbon atoms, a cycloalkyl radical such as the cyclohexyl or methylcyclohexyl radical, an aralkyl radical, particularly a phenylalkyl radical such as the benzyl radical, or a homocyclic aryl radical such as the phenyl radical. When these hydrocarbon radicals are substituted, then examples of substituents are halogens such as fluorine, chlorine or bromine, cyano groups, phenyl groups, hydroxyl groups, low alkoxy groups or phenoxy groups. Preferably, however, Z is hydrogen.

When each of $R_1$, $R_2$ and $R_3$ represents an alkyl radical then this can have up to 12, preferably 1 to 5 carbon atoms and the chain can be straight or branched. If this alkyl radical is substituted, examples of substituents are the hydroxyl group, alkoxy groups such as unsubstituted alkoxy, alkoxyalkoxy or alkoxyalkoxyalkoxy groups or alkoxycarbonyl groups, in each of which the alkoxy unit preferably has 1 to 4 carbon atoms, also acyloxy groups, particularly low alkanoyloxy groups such as the acetyloxy or propionyloxy group, phenyl groups, phenoxy groups cyano groups or halogens such as fluorine, chlorine or bromine. Cycloalkyl or aralkyl radicals symbolised by $R_1$, $R_2$ and $R_3$ are, e.g. the cyclohexyl or methyl-cyclohexyl groups or phenyl alkyl groups such as the benzyl group, the benzene nuclei of which can contain the non-ionogenic substituents, particularly low alkyl or alkoxy groups, listed above for A.

The pyrimidine compounds of Formula II usable as coupling components according to the invention are produced by reacting the three chlorine atoms of the 2,4,6-trichloro-pyrimidine one after the other with primary aliphatic, cycloaliphatic or araliphatic amines as defined or with a metal salt of an aliphatic, cycloaliphatic or araliphatic hydroxyl or mercapto compound as defined. Preferably, less reactive amines are used in the first step, and, in the second and third steps, more easily reactive, more strongly basic amines, alcoholates or mercaptides are used in any order desired. The products resulting from the first step are generally mixtures of isomers of 2-amino-4,6-dichloro-pyrimidines and 4-amino-2,6-dichloro-pyrimidines which can be separated, if desired, by recrystallisation or by chromatographic adsorption, e.g. on aluminum oxide.

Preferably, however, the mixtures of isomers are used as they yield mixtures of azo pyrimidine dyestuffs according to the invention which are distinguished by unexpectedly good buildup.

The step-wise reaction is performed, e.g. in aqueous, organic or organic-aqueous solution or dispersion, optionally in the presence of acid binding agents such as alkali and alkaline earth carbonates or oxides, or tertiary nitrogen bases. Suitable organic solvents are, e.g. alcohols such as methanol or ethanol, ethylene glycol monomethyl ether or monoethyl ether, preferably however, aliphatic ketones such as acetone, methylethyl ketone or methylisobutyl ketone, cyclic ethers, e.g. dioxane and tetrahydrofuran, or optionally halogenated or nitrated aromatic hydrocarbons such as toluene, xylenes, chlorobenzene or nitrobenzene.

The reaction of the first chlorine atom of the 2,4,6-trichloro-pyrimidine is performed at low temperatures, advantageously at 20–60° C., the second chlorine atom is reacted at moderate temperatures, preferably at 70–100° C., and the third chlorine atom is reacted at higher temperatures, preferably between 100 and 180° C., optionally in a closed reaction vessel.

If, in the pyrimidine coupling components of Formula II usable according to the invention, one R of $R_1$, $R_2$ and $R_3$ represents a radical of the formula —alk—OH and the other R's each represent an alkyl radical containing, as non-ionogenic groups, optionally one or more hydroxyl groups, then these hydroxyl groups can be subsequently acylated. Acylating agents for this purpose are the anhydrides or low carboxylic acids such as acetic anhydride or propionic acid anhydride, acyl chlorides and bromides of the aliphatic and aromatic series, e.g. acetyl chloride, propionyl chloride or benzoyl chloride or bromide, also chloroformic or bromoformic acid esters, particularly chloroformic or bromoformic acid methyl or ethyl ester.

The diazonium compound of an amine of Formula I is coupled with the coupling component of Formula II by the usual methods, preferably in mineral acid to weakly acid aqueous medium, in particular at a pH value of 4–4.5. When the coupling is performed in a mineral acid medium, advantageously the acid is gradually buffered, e.g. with alkali metal salts of low fatty acids. In many cases, the coupling of a mixture of isomers of pyrimidine coupling components usable according to the invention in particular with a suitable diazonium compound has proved to be very advantageous.

A modification of the process according to the invention for the production of difficultly water soluble azo dyestuffs of Formula III wherein of $R_1$, $R_2$ and $R_3$, at least one R represents an alkyl radical substituted by acyloxy groups, consists in reacting a compound of the formula

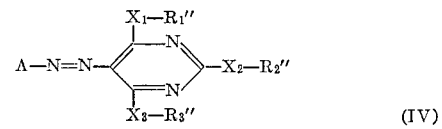

(IV)

wherein

A represents preferably $A_1$, of $R_1''$, $R_2''$ and $R_3''$, one R'' represents a radical of the formula —alk—OH and the other (R'')'s represent the aforesaid radical or an unsubstituted alkyl group, a substituted alkyl group different therefrom or an optionally substituted cycloalkyl or aralkyl group, and $X_1$, $X_2$, $X_3$ and —alk— have the meanings given above, with an acylating agent, the starting materials being so chosen that the end dyestuff contains no ionogenic groups forming salts in water.

Azo compounds of Formula IV are obtained, e.g. by coupling the diazonium compound of an amine of Formula I with the corresponding pyrimidine coupling component, the coupling being performed in the manner described above.

Suitable acylating agents for the acylating of azo compounds of Formula IV usable according to the invention are, e.g. those mentioned above.

The acylation is performed advantageously at a raised temperature in a suitable organic solvent such as glacial acetic acid, chlorobenzene or dioxane, optionally in the presence of an acid binding agent such as sodium acetate or pyridine.

The dyestuffs according to the invention are brought in the presence of a carrier such as trichlorobenzene. The dyeings are very fast to light and sublimation.

The 2,4-bis-ethylamino-6-(3-hydroxy-ethoxy)-pyrimidine used in this example as coupling component is obtained, e.g. by reacting the 2,4-bis-ethylamino-6-chloropyrimidine with the monosodium salt of ethylene glycol at a temperature of 75–100°.

Dyestuffs having similar good properties are obtained when the equivalent amount of each of the diazo components given in column 2 of the following Table I is coupled with one of the coupling components given in column 3 under the conditions described in this example.

TABLE I

| Example No. | Diazo component | Coupling component | Shade on polyglycol terephthalate fibres |
|---|---|---|---|
| 2 | 1-amino-4-nitrobenzene | 2-($\beta$-hydroxy-ethylamino)-4-ethylamino-6-phenoxy-pyrimidine | Yellowish orange. |
| 3 | 1-amino-2-bromo-4-nitrobenzene | 2-ethylamino-4-($\gamma$-hydroxy-propylamino)-6-ethoxy-pyrimidine | Do. |
| 4 | 1-amino-2-methoxy-4-nitrobenzene | 2,4-bis-ethylamino-6-($\beta$-methoxy-ethoxy)-pyrimidine | Reddish orange. |
| 5 | 1-amino-2-methyl-4-nitrobenzene | 2,4-bis-methylamino-6-($\beta$-phenoxy-ethoxy)-pyrimidine | Orange. |
| 6 | 1-amino-2,4-dinitrobenzene | 2-ethylamino-4-($\gamma$-methoxy-propylamino)-6-phenylthiopyrimidine | Scarlet. |
| 7 | do | 2-ethylamino-4-($\beta$-phenoxy-ethylamino)-6-butylthiopyrimidine | Do. |
| 8 | 1-amino-2,4-dinitro-6-chlorobenzene | 2,4-bis-ethylamino-6-($\beta$-hydroxy-ethoxy)-pyrimidine | Orange. | into a finely distributed form by milling with surface active dispersing agents. Suitable dispersing agents are, e.g. anionic ones such as alkali metal salts of sec. higher alkylaryl sulphonates, alkali metal salts of condensation products of formaldehyde with naphthalene sulphonic acids, lignin sulphonates, or non-ionogenic dispersing agents such as fatty alcohol polyglycol ethers.

In this specification and the appended claims the term "lower" (or "low") used in connection with aliphatic radicals means groups containing not more than 5 carbon atoms.

The following non-limitative examples illustrate the invention further. The temperatures are given therein in degrees centigrade and parts and percentages are given by weight unless expressly stated otherwise. "Polyglycol terephthalate" represents the products known under the trade names Terylene, Vycron, Dacron and Trevira.

EXAMPLE 1

16.3 g. of 1-amino-2-cyano-4-nitrobenzene are dissolved in 200 g. of concentrated sulphuric acid and, at 5–10°, the solution is diazotized with an amount of nitrosyl sulphuric acid corresponding to 6.1 g. of sodium nitrite. The diazonium salt solution so obtained is added dropwise, at 0–5°, to a solution of 22.6 g. of 2,4-bis-ethyl amino-6-($\beta$-hydroxy-ethoxy)-pyrimidine in 100 g. of methyl alcohol, 150 g. of 36% hydrochloric acid and 400 g. of water. The coupling mixture is stirred for 4 hours at 0–10°. Then the precipitated dyestuff the composition of which corresponds to the formula

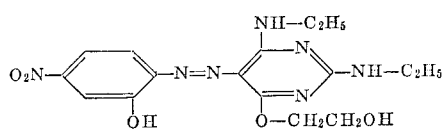

is separated by filtration, washed with water and then dried in the usual way. 10 g. of the dyestuff produced in this way are brought into a finely dispersible form by milling with 35 g. of a lignin sulphonate. Polyglycol terephthalate fibres can be dyed in pure orange shades with this dye preparation from aqueous dispersion, optionally By repeating Example 1, but using in lieu of the 1-amino-2-cyano-4-nitrobenzene employed therein an equivalent amount of an amine of the formula

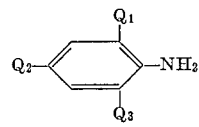

wherein $Q_1$, $Q_2$, and $Q_3$ represent the substituents given in the respectively entitled columns of the following Table II, and in lieu of the pyrimidine coupling component used therein an equivalent amount of a coupling component of the formula

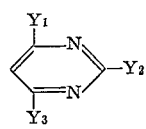

wherein $Y_1$, $Y_2$ and $Y_3$ have the meanings given in the respectively headed columns of Table II, there are obtained the correspondingly substituted dyestuffs of the formula

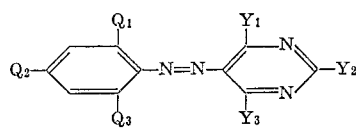

which dye polyglycol terephthalate fibers in the shades given in the last column of Table II, the resulting dyeings having the fastness properties described hereinbefore.

The cyclohexyl radical is represented by

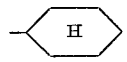

The production of the pyrimidine coupling components is carried out by the same procedure as has been described in Examples 195 to 197 of our copending application Ser. No. 681,554 and in Examples 70 to 72 our copending application Ser. No. 681,553, both filed of even date with this application.

TABLE II

| Example No. | $Q_1$ | $Q_2$ | $Q_3$ | $Y_1$ | $Y_2$ | $Y_3$ | Shade on polyglycol-terephthalate fibres |
|---|---|---|---|---|---|---|---|
| 9 | $-NO_2$ | $-SO_2CH_3$ | $-H$ | $-OCH_2CH_2OH$ | $-NH-C_2H_5$ | $-NH-C_2H_5$ | Orange. |
| 10 | $-CN$ | $-NO_2$ | $-H$ | $-O-CH_2CH_2OCOCH_3$ | $-NHCH_2CH_2OCOCH_3$ | $-NH-CH_3$ | Do. |
| 11 | $-NO_2$ | $-NO_2$ | $-H$ | $-OCH_2CH_2OCOOC_2H_5$ | $-NH-C_3H_7$ | $-NH-\phenyl$ | Do. |
| 12 | $-NO_2$ | $-SO_2-\phenyl$ | $-H$ | $-NH-CH_2CH_2OCO-\phenyl$ | $-NH-CH_3$ | $-OC_2H_5$ | Do. |
| 13 | $-NO_2$ | $-SO_2-\phenyl(CH_3)$ | $-H$ | $-NH-CH_2CH_2-OSO_2-\phenyl$ | $-NH-C_2H_5$ | $-OC_2H_5$ | Do. |
| 14 | $-COOC_2H_5$ | $-NO_2$ | $-H$ | $-SCH_2CH_2O-\phenyl$ | $-NH-C_2H_5$ | $-NH-CH_3$ | Do. |
| 15 | $-NO_2$ | $-COOCH_2CH_2OH$ | $-H$ | $-S-C_4H_9$ | $-NH-CH_2CH_2-OSO_2-\phenyl(CH_3)$ | $-NH-CH_3$ | Do. |
| 16 | $-NO_2$ | $-COOCH_2CH_2OCH_3$ | $-H$ | $-NH-CH_2CH_2OCH_3$ | $-OCH_2-\phenyl$ | $-NH-CH_3$ | Do. |
| 17 | $-NO_2$ | $-SO_2NH_2$ | $-H$ | $-OCH_2CH_2O-\phenyl$ | $-NH-C_4H_9$ | $-NH-C_4H_9$ | Do. |
| 18 | $-NO_2$ | $-SO_2NHCH_3$ | $-H$ | $-O-CH_2CH_2O-\phenyl$ | $-NH-CH_3$ | $-NH-CH_3$ | Do. |
| 19 | $-NO_2$ | $-SO_2NHCH_2CH_2OH$ | $-H$ | $-NH-C_2H_5$ | $-O-CH_2-CH_2-OCH_3$ | $-NH-C_2H_5$ | Do. |
| 20 | $-QO_2N(CH_3)_2$ | $-NO_2$ | $-H$ | $-O-\phenyl$ | $-NHCH_2CH_2OH$ | $-NH-CH_3$ | Do. |
| 21 | $-SO_2N(CH_3)(CH_2CH_2OH)$ | $-NO_2$ | $-H$ | $-S-CH_2-\phenyl$ | $-NHCH_2CH_2OH$ | $-NH-CH_2CH_2OH$ | Do. |
| 22 | $-NO_2$ | $-SO_2NH(CH_2)_3OCH_3$ | $-H$ | $-O-CH_2CH_2OC_2H_5$ | $-NH-CH_3$ | $-NH-CH_3$ | Do. |
| 23 | $-NO_2$ | $-SO_2-NH-\phenyl(H)$ | $-H$ | $-OCH_2CH_2OC_2H_5$ | $-NH-CH_3$ | $-NH-CH_2-\phenyl$ | Do. |
| 24 | $-NO_2$ | $-SO_2NH-\phenyl(CH_3)$ | $-H$ | $-NH-CH_2CH_2OH$ | $-NH-C_2H_5$ | $-O-\phenyl$ | Do. |
| 25 | $-NO_2$ | $-SO_2NH-CH_2-\phenyl$ | $-H$ | $-NH-CH_2CH_2OCOCH_3$ | $-NHCH_2CH_2OH$ | $-NH-CH_3$ | Do. |
| 26 | $-NO_2$ | $-CONH_2$ | $-H$ | $-O-CH_2CH_2CH_2OH$ | $-NH-CH_3$ | $-NH-CH_3$ | Do. |
| 27 | $-NO_2$ | $-CONHCH_3$ | $-H$ | $-OCH_2CH_2OCOC_3H_7$ | $-NH-C_2H_5$ | $-NH-C_2H_5$ | Do. |

TABLE II—Continued

| Example No. | $Q_1$ | $Q_2$ | $Q_3$ | $Y_1$ | $Y_2$ | $Y_3$ | Shade on polyglycol-terephthalate fibres |
|---|---|---|---|---|---|---|---|
| 28 | $-NO_2$ | $-CONHCH_2CH_2OH$ | $-H$ | $-NH-CH_2-$ (phenyl) | $-NH-CH_2CH_2OH$ | $-OC_2H_5$ | Orange. |
| 29 | $-NO_2$ | $-CONH(H_2)_3OCH_3$ | $-H$ | $-NH-CH_2-$ (phenyl) | $-NH-C_2H_5$ | $-OCH_2CH_2OH$ | Do. |
| 30 | $-CO-NH-$ (phenyl) | $-NO_2$ $CH_3$ | $-H$ | $-NH-CH_2-$ (phenyl) | $-NH-C_2H_5$ | $-OCH_2CH_2OH$ | Do. |
| 31 | $-NO_2$ | $-CON$ (phenyl) | $-H$ | $-NH-CH_2-$ (phenyl) | $-NH-C_2H_5$ | $-OCH_2CH_2OH$ | Do. |
| 32 | $-NO_2$ | $-CONHCH_2-$ (phenyl) | $-H$ | $-NHCH_2CH_2O-$ (p-CH_3-phenyl) | $-NHC_2H_5$ | $-NHC_2H_5$ | Do. |
| 33 | $-Br$ | $-NO_2$ | $-Br$ | $-NHCH_2CH_2O-$ (p-Cl-phenyl) | $-NHC_2H_5$ | $-NHC_2H_5$ | Do. |
| 34 | $-NO_2$ | $-CH_3$ | $-H$ | $-NHCH_2CH_2O-$ (p-Br-phenyl) | $-NHC_2H_5$ | $-NHC_2H_5$ | Do. |
| 35 | $-NO_2$ | $-O-$ (phenyl) | $-H$ | $-NH-CH_2-CH_2O-$ (p-OCH_3-phenyl) | $-NHC_2H_5$ | $-NHC_2H_5$ | Do. |
| 36 | $-NO_2$ | $-NO_2$ | $-Cl$ | $\{-NH-CH_2-CH_2OH$ ; $-NH-C_2H_5\}$ | $\{-NH-C_2H_5$ ; $-NH-CH_2CH_2OH\}$ | $\{-OC_2H_5$ ; $-OC_2H_5\}$ | Do. |
| 37 | $-H$ | $-NO_2$ | $-H$ | $\{-NH-CH_2CH_2OH$ ; $-NH-C_2H_5\}$ | $-NH-C_2H_5$ | $\{-OC_2H_5$ ; $-OC_2H_5\}$ | Yellowish orange. |
| 38 | $-H$ | $-NO_2$ | $-H$ | $-OCH_2CH_2OC_2H_5$ | $-NHCH_2-$ (phenyl) 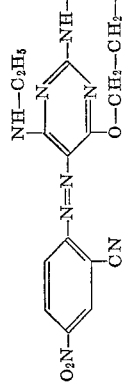 | $-NH-CH_2-$ (phenyl) | Do. |
| 39 | $-Cl$ | $-NO_2$ | $-H$ | $-NH-CH_2-CH(OH)-$ (phenyl) | $-NH-C_2H_5OCH_3$ | $-OC_2H_5$ | Do. |

EXAMPLE 40

25 g. of the dyestuff obtained according to Example 1 are suspended in 150 g. of glacial acetic acid, 20 g. of acetic anhydride are added and then heated for 3 hours at 85–95°. Subsequently the temperature of the reaction mixture is allowed to cool to 40–45°, and 150 g. of methyl alcohol are added dropwise at this temperature. Then the mixture is allowed to cool completely and the dyestuff precipitate, whose composition corresponds to the formula $$O_2N-\text{(phenyl)}-N=N-\text{(phenyl with CN)}-\begin{array}{c}NH-C_2H_5 \\ \text{(pyrimidine)} \\ O-CH_2-CH_2-O-CO-CH_3 \\ -NH-C_2H_5\end{array}$$

is separated by suction filtration and the orange colored acetylation product is dried at 60–70°. 10 g. of the dyestuff obtained are finely ground with 20 g. of a lignin sulfonate. Polyglycol terephthalate fibers are dyed with this preparation, optionally in the presence of a swelling agent such as trichlorobenzene, in pure orange shades. The dyeings are very level and possess very good light-fastness.

EXAMPLE 41

In an apparatus for dyeing under pressure, 4 g. of the dyestuff obtained according to Example 25 are finely suspended in 2000 g. of water which contains 4 g. of oleyl polyglycol ether. The pH of the dyebath is adjusted to 5–5.5 with acetic acid.

100 g. of polyglycol terephthalate fabric are then introduced at 50°, the bath is heated within 30 minutes to 140° and dyeing is performed for 50 minutes at this temperature. The dyeing is then rinsed with water, soaped and dried. Under these conditions, a pure orange dyeing is obtained which is fast to washing, perspiration, light and sublimation.

The dyestuffs described in the other examples produce dyeings of equal quality by this process.

EXAMPLE 42

2 g. of the dyestuff obtained according to Example 36 are dispersed in 4000 g. of water. 12 g. of sodium-o-phenylphenolate are added to this dispersion as carrier and also 12 g. of diammonium phosphate are added, and 100 g. of polyglycol terephthalate yarn are dyed for 1½ hours at 95–98°. The dyeing is rinsed and aftertreated with dilute sodium hydroxide solution and a dispersing agent.

In this way, a pure orange dyeing which is fast to washing, light and sublimation is obtained.

If in the above example, the 100 g. of polyglycol terephthalate yarn are replaced by 100 g. of cellulose triacetate fabric, dyeing is performed under the conditions given and then the dyeing is rinsed with water, an orange dyeing is obtained which has very good fastness to washing and sublimation.

EXAMPLE 43

Polyglycol terephthalate fabric is impregnated in a padding mangle at 40° with a liquor of the following composition:

35 parts by weight of the dyestuff obtained according to Example 1, finely dispersed in
7.5 parts by weight of sodium alginate,
20 parts by weight of triethanolamine,
20 parts by weight of octylphenol polyglycol ether and
900 parts by weight of water.

The fabric squeezed out of a content of about 100% impregnation liquor is dried at 100° and then is fixed for 30 seconds at a temperature of 210°. The dyed goods are rinsed with water, soaped and dried. Under these conditions, an orange dyeing is obtained which is fast to washing, rubbing, light and sublimation.

The dyestuffs described in the other examples produce dyeings of equal quality by this process.

EXAMPLE 44

2 g. of the dyestuff produced according to Example 9 are dispersed in 4000 g. of water. 8 g. of oleic acid-N-methyl tauride are added to this dispersion and 100 g. of cellulose-2½-acetate yarn are dyed for 1 hour at 80°. The dyeing is rinsed and then dried.

In this way, an orange dyeing is obtained which is fast to perspiration, rubbing and light.

We claim:
1. A dyestuff of the formula

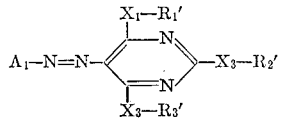

wherein
$A_1$ represents a phenyl radical substituted as follows:
  (a) by, as first substituent, a nitro group;
  (b) by a second substituent selected from hydrogen, nitro, cyano, chlorine, bromine, lower alkyl, lower alkoxy, phenoxy, lower alkylsulfonyl, phenoxysulfonyl, lower alkylphenoxysulfonyl, lower alkoxycarbonyl, hydroxy-lower alkoxycarbonyl, lower alkoxy-lower alkoxycarbonyl and a substituent of the formula

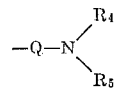

wherein
Q represents —$SO_2$— or —CO—;
$R_4$ represents hydrogen, lower alkyl, hydroxy-lower alkyl, lower alkoxy-lower alkyl, phenyl, benzyl or cyclohexyl; and
$R_5$ represents hydrogen, lower alkyl or hydroxy-lower alkyl; and
  (c) by a third substituent selected from hydrogen, chlorine or bromine;
    one of the radicals —$R_1'$, —$R_2'$ and —$R_3'$ represents alkyl or phenyl alkyl the alkyl group having from 2 to 5 carbon atoms substituted by one of the following: hydroxy, lower alkoxy, cyclohexyloxy, benzyloxy, phenyloxy, phenyloxy substituted by a member of the group of (a) lower alkyl, (b) lower alkoxy, (c) chlorine and (d) bromine, lower alkanoyloxy, benzoyloxy, lower alkoxycarbonyloxy, phenyl-sulfonyloxy and lower alkylphenylsulfonyloxy;
    a second R' represents lower alkyl, cyclohexyl, benzyl, hydroxy-lower alkyl, lower alkoxy-lower alkyl or lower alkanoyloxy-lower alkyl,
    the third R' represents the same group as the second R' or a phenyl radical bound by way of an —O— or —S— bridge to the pyrimidine nucleus, and
    one of $X_1$, $X_2$ and $X_3$ represents —O— or —S—, and the other two X's represent —NH—.

2. A dyestuff as defined in claim 1, wherein said nitro group substituent of $A_1$ is in o- or p-position relative to the azo bridge at the said phenyl radical.

3. A dyestuff as defined in claim 2, which is of the formula

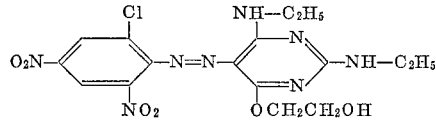

4. A dyestuff as defined in claim 2, which is a mixture of the two isomers falling under the formula

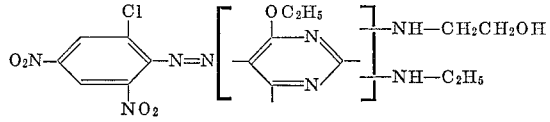

5. A dyestuff as defined in claim 2, which is a mixture of the two isomers falling under the formula

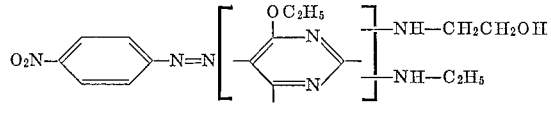

References Cited

UNITED STATES PATENTS 3,042,648  7/1962  Lewis _____ 260—154 X

CHARLES B. PARKER, Primary Examiner

D. M. PAPUGA, Assistant Examiner

U.S. Cl. X.R.

260—256.4, 256.5; 8—26, 41, 50, 54, 54.2, 55; 106—22, 288